United States Patent [19]

Selsam

[11] 4,143,585

[45] Mar. 13, 1979

[54] IMPACT TOOL

[75] Inventor: Roger L. Selsam, Fairport, N.Y.

[73] Assignee: Hydroacoustics, Inc., Rochester, N.Y.

[21] Appl. No.: 822,113

[22] Filed: Aug. 5, 1977

Related U.S. Application Data

[63] Continuation-in-part of Ser. No. 682,820, May 3, 1976, abandoned.

[51] Int. Cl.² ........................ F01B 7/18; F01L 17/00; F01L 25/06
[52] U.S. Cl. ........................................ 91/276; 91/284; 91/289; 91/303; 91/319; 91/321; 91/328
[58] Field of Search ................. 91/276, 321, 320, 319, 91/303, 284, 285, 289, 328

[56] References Cited

U.S. PATENT DOCUMENTS

| 795,003 | 7/1905 | Petling | 91/284 |
|---|---|---|---|
| 1,058,919 | 4/1913 | Stoner | 91/284 |
| 1,090,417 | 3/1914 | Schmidt | 91/284 |
| 2,609,791 | 9/1952 | Bohlmon | 91/284 |
| 4,022,108 | 5/1977 | Juvonen | 91/276 |

Primary Examiner—Paul E. Maslousky
Attorney, Agent, or Firm—Martin LuKacher

[57] ABSTRACT

An impact tool is described which is capable of developing percussive forces for rock drilling, pile driving, seismic exploration and other repetitive high force applications. The tool contains a hammer and a valve which may be hydraulically actuated so as to oscillate; repetitively executing forward and return strokes during each cycle of oscillation. The valve is actuated in the forward stroke direction by being engaged by the hammer, and in the return stroke direction by fluid pressure means so as to switch the pressure in a cavity in which both the valve and the hammer are disposed for developing forces on the hammer so as to sustain its oscillation. A fluid filled pocket is provided into which the valve enters as it moves in the forward stroke direction, after having switched the pressure in the cavity. A passage is provided on the hammer which is dimensioned so that fluid in the cavity is either connected to a channel, the cavity, or entrapped in the pocket, depending on the position of the hammer. A control valve in the channel determines the flow through the channel, and thus the displacement of the valve into the pocket. The displacement is maintained until communication between the pocket and the cavity is provided via the passage. Control is thereby provided over the stroke of the valve and the period between switching of the pressure in the cavity. The hammer stroke length and the frequency and energy of the impacts delivered by the hammer are dependent upon the switching period, and may be varied by the use of the control valve.

21 Claims, 6 Drawing Figures

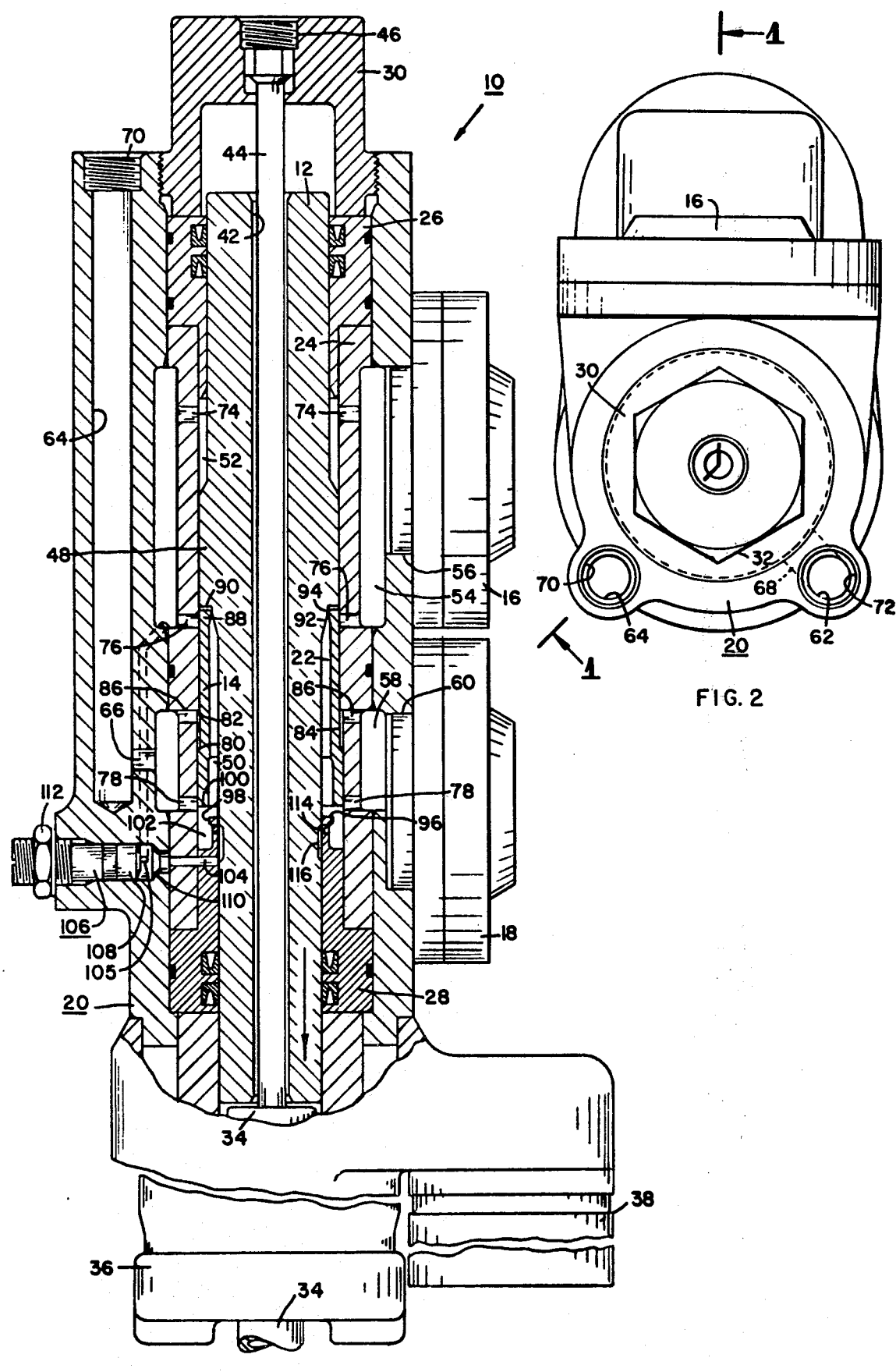

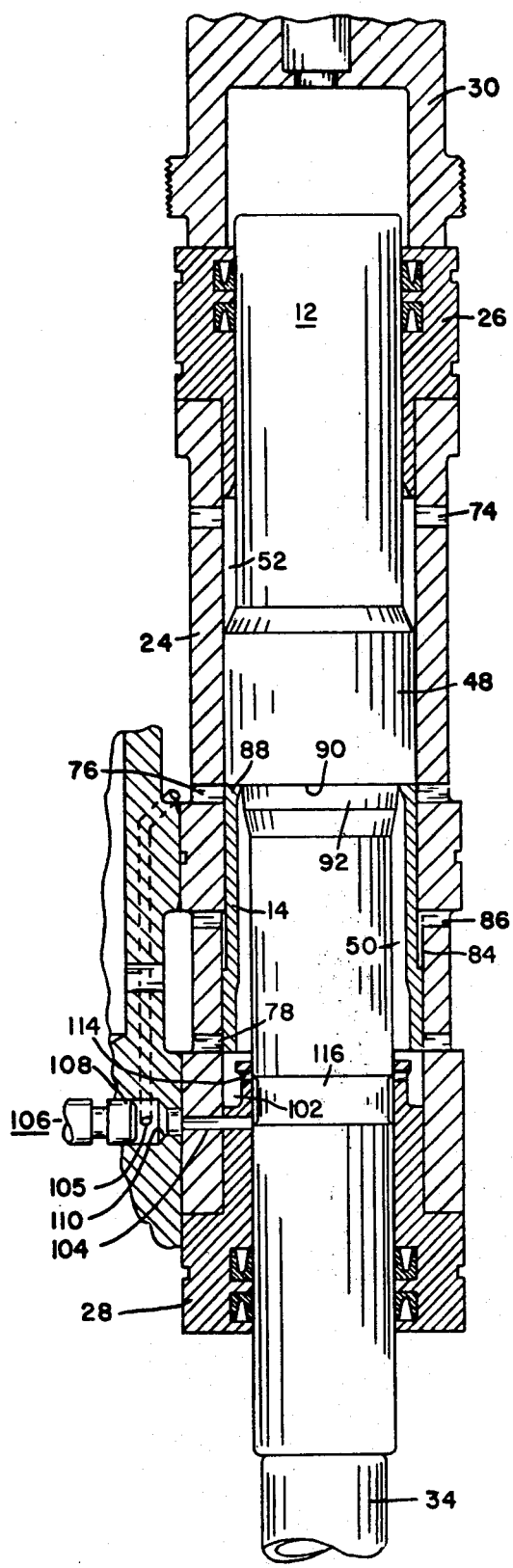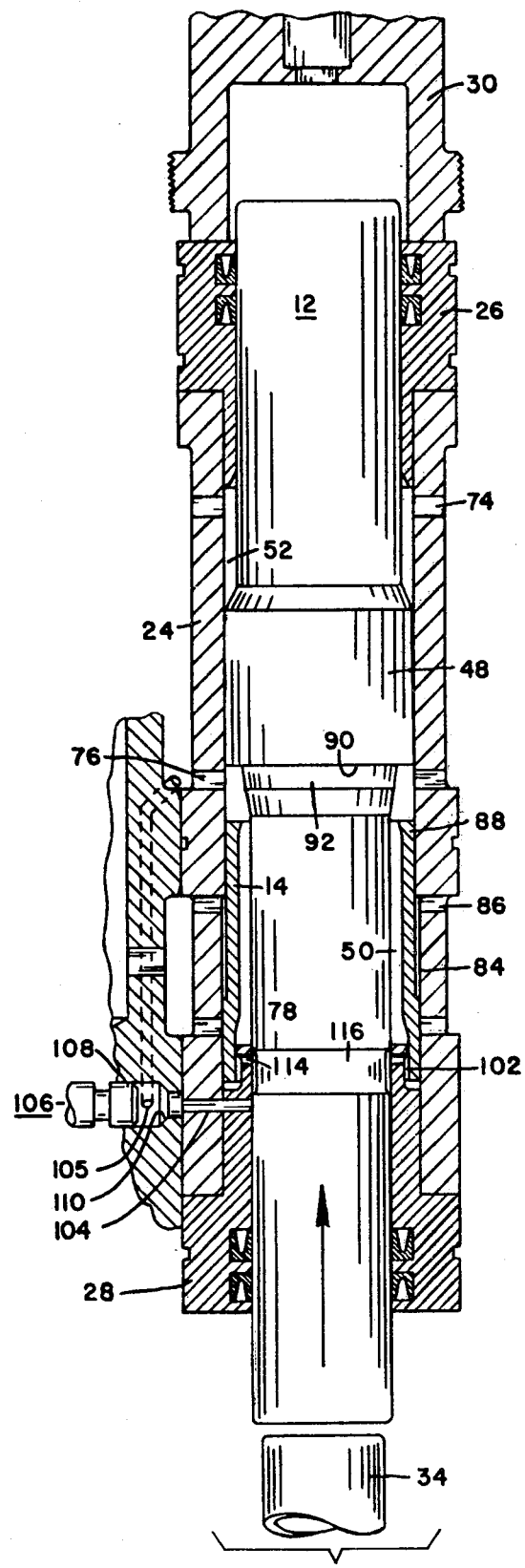
FIG. 3
FIG. 4

IMPACT TOOL

This application is a continuation of my application Ser. No. 682,820, filed May 3, 1976, now abandoned.

The present invention relates to pressurized fluid oscillators and particularly to impact tools having an oscillatory hammer and a valve which controls the application of pressurized fluid forces to the hammer to maintain the oscillation thereof for the purpose of delivering repetitive impacts to a load.

The invention is especially suitable for use in rock drills, pile drivers, and demolition tools as well as a seismic sound source in geophysical exploration. The invention is also applicable for use in hydroacoustic apparatus of the type disclosed in U.S. Pat. Nos. 3,896,899; 3,903,972 and 3,911,789, and in U.S. Patent application, Ser. No. 522,977, filed Nov. 11, 1974, in the name of John V. Bouyoucos, et al, now U.S. Pat. No. 4,005,637, and in U.S. Patent Application, Ser. No. 666,733, filed Mar. 15, 1976 in the name of John V. Bouyoucos now U.S. Pat. No. 4,077,304. More particularly, the invention is an improvement upon the apparatus described in application Ser. No. 666,733.

It is particularly desirable to control the impact or blow frequency as well as the impact or blow energy which is generated by an impact tool so as to generate percussive energy in a manner which may be most effectively utilized, as in penetrating a rock formation. In order to make most efficient use of the available input power, the control of blow frequency and the energy delivered by each blow should be obtained without wasting the input power or otherwise derogating the performance of the impact tool. It is also desirable that the mechanism for varying the blow frequency and energy be implemented without complicating the design of the impact tool and significantly increasing its cost.

It is the aim of this invention to provide an improved impact tool capable of delivering repetitive percussive energy or impacts at frequencies and energy per impact which may be varied.

It is another aim of this invention to provide an improved impact tool with blow energy and frequency control which also has high operating efficiency.

It is a still further aim of the present invention to provide an improved impact tool wherein blow frequency and energy control may be economically implemented.

Briefly described, a pressurized fluid oscillator embodying the invention, which may be used in an impact tool so as to provide blow frequency and energy control, includes a hammer and a valve wherein the valve is actuated by hammer engagement when the hammer travels in the forward direction to an impact position. The valve may be fluid pressure actuated in the return stroke direction so as to have a hybrid-mechanical/fluid pressure actuation cycle. Both the valve and the hammer are movably disposed in a cavity in which pressurized fluid is switched between supply and return, alternately, by the valve as it travels in the forward and return stroke direction so as to develop forces which effect oscillation of the hammer in the forward and return stroke directions. A pocket extends into this cavity and is entered by the valve upon its movement in the forward stroke direction, after it has been engaged by the hammer and has switched the pressure in the cavity. This occurs, preferably, when the hammer has reached the impact position such that it is arrested and the valve travels under its own momentum into the pocket. The hammer is provided with a passage such as a porting groove which provides communication of the fluid trapped in the pocket through a channel which may be connected to a fluid pressure outlet to supply. In this channel there may be disposed a control valve which controls the flow of the fluid from the pocket during a first interval of time. By closing the control valve the displacement of the valve into the pocket, and thus the stroke of the valve and the time interval between the switching of the pressure in the cavity can be controlled. Accordingly, the control valve serves to control both the frequency and the length of the hammer stroke, thereby effectively controlling the blow frequency and blow energy.

As the hammer travels away from the impact position in the return stroke direction, the porting groove in the hammer first closes the pocket to trap the fluid and the valve therein for a second interval of time. Then the porting groove connects the pocket with the cavity, thus releasing the valve from the pocket and enabling the development of pressurized fluid forces on the valve so as to drive it rapidly in the return stroke direction after the first and second time intervals during which the fluid flows out of the pocket and is trapped in the pocket. The fluid pressure in the cavity is thus switched rapidly due to the rapid movement of the valve both upon engagement by the hammer and by the pressurized fluid forces, alternately between return and supply pressure so as to maintain the efficiency of operation of the oscillator and the impact tool in which it is used.

The foregoing and other features and advantages of the invention, as well as the mode of operation and the presently preferred embodiment thereof, will be more apparent from a reading of the following specification in connection with the accompanying drawings in which:

FIG. 1 is a sectional view of an impact tool embodying the invention; the section being taken along the line 1—1 in FIG. 2.

FIG. 2 is a top view of the tool shown in FIG. 1; and

Figure 5:
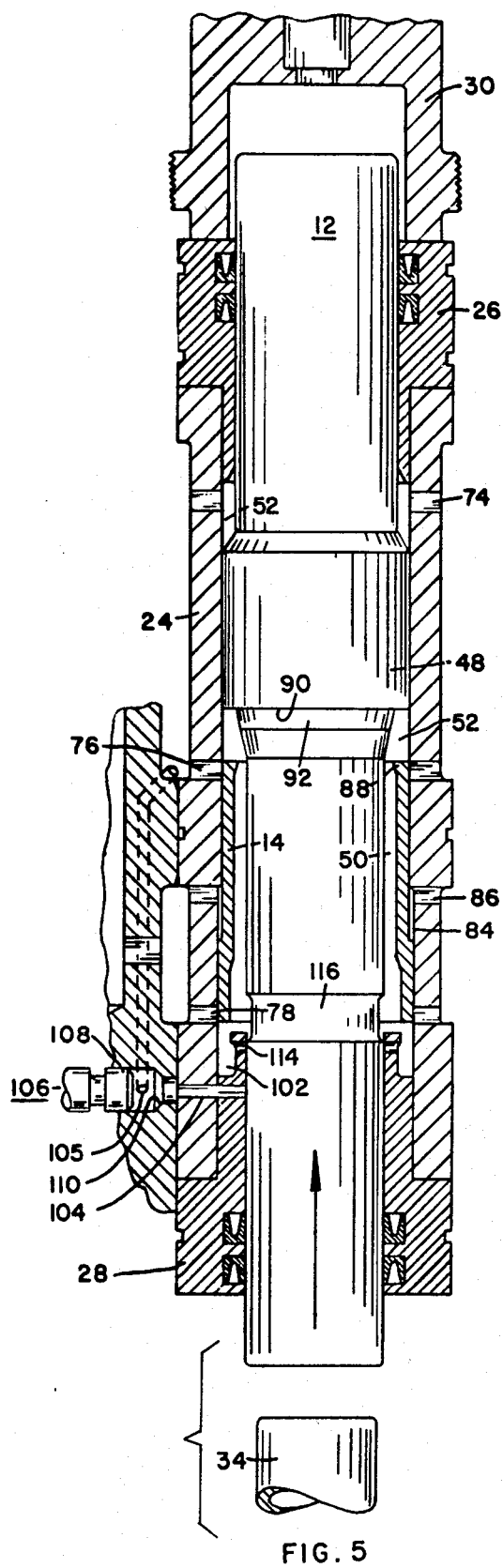

FIGS. 3 through 6, inclusive, are fragmentary sectional views illustrating the tool shown in FIGS. 1 and 2 in different position during its cycle of operation.

Referring to FIGS. 1 and 2, there is shown a hydraulic fluid operated impact tool 10. Such tools are also known as percussive tools or percussive drills. The tool 10 contains a pressurized hydraulic fluid operated, hydroacoustic oscillator which includes a hammer 12, a valve element 14, and supply and return accumulators 16 and 18, in a housing 20 to which the accumulators 16 and 18 are attached. The hammer 12, acting like a piston, oscillates reciprocally in a central opening or cavity 22. The opening 22 extends axially of the housing 20 and is in the form of a bore in a cylindrical sleeve or liner 24. The opposite ends of the hammer 12 are slidably disposed in bearing members 26 and 28 which are located at opposite ends of the liner 24. An end cap 30, the upper end of which contains wrenching flats 32, is threadedly engaged at the upper end of the housing 20 and retains the liner 24 and the bearing members 26 and 28 within the housing 20.

The hammer 12 impacts upon a shank 34. A chuck assembly 36 holds the shank for rotation by means of a hydraulic motor 38. The other end of the shank 34 extends beyond the chuck assembly for connection to a drill steel. The shank is part of an anvil system which transmits the percussive forces or blows created by the impact of the lower end of the hammer 12 upon the shank 34 to a load which may be the drill steel with a rock bit at the end thereof engaged with a rock formation. Reference may be had to U.S. Pat. No. 3,640,351, issued Feb. 8, 1972 for further information respecting the design of the shank 34 and chuck assembly 36. The above referenced patent also discusses the use of passages such as a bore 42 in the hammer 12 and in the shank in which a tube 44 is located for the passage of cleansing fluid, suitably air or water, for flushing and cleaning the holes drilled by the tool. A coupling 46 in the end cap 30 provides for connection of a hose which carries the cleansing fluid to the tube 44.

The hammer 12 oscillates in opposite directions along the axis of the opening 22. One of these directions is the forward stroke direction of the hammer towards an impact position where the lower end of the hammer impacts the shank 34. The hammer is shown in FIG. 1 travelling in the forward stroke direction just before it reaches this impact position. The hammer travels in the reverse stroke direction away from the impact position.

The hammer has a central section 48 of diameter slightly less than the diameter of the liner bore. The central section 48 divides the cavity 22 into a lower cavity 50 and an upper cavity 52. The opposite sides of the section 48 present areas on which forces are developed in planes normal to the direction of hammer motion for driving the hammer. The drive area presented to the lower cavity 50 is larger than the drive area presented to the upper cavity 52; the drive area presented to the lower cavity being suitably twice as large as that presented to the upper cavity.

The upper cavity 52 receives supply pressure from a cylindrical gallery 54. This gallery 54 is connected by way of a lateral passage 56 to the supply accumulator 16. A lower cylindrical gallery 58 is connected to the return accumulator 18 by way of a lateral passage 60. Channels 62 and 64 (see FIG. 2) through which hydraulic fluid at supply and return pressures are supplied to the upper and lower galleries 58 and 60 are located in the housing. The channel 64 is connected to the lower gallery 60 by way of a lateral passage 66. The supply pressure channel 62 is connected to the upper gallery 54 by way of a passage 68. A coupling 70 in the housing connects the return channel 64 to the return side of a hydraulic pump or to a reservoir connected to the return side of the pump. A coupling 72 in the housing 20 connects the supply channel 62 to the supply or high pressure side of the pump. The upper cavity 52 is in continuous communication with the supply gallery 54 through lateral passages 74, several of which are radially disposed circumferentially around the liner 24. Supply pressure in the upper cavity thus continuously urges the hammer in the forward stroke direction.

A supply port 76 and a return port 78 are provided by several holes which extend radially through the liner 24. These holes are spaced from each other circumferentially around the liner 24 and provide a large porting area around the periphery of the liner 24. The supply port 76 communicates supply pressure from the supply gallery 54, and the return port 78 communicates return pressure from the return gallery 58.

The valve element 14 is a cylindrical sleeve in sliding contact with the peripheral surface of the liner 24 and is in porting relationship with the supply and return ports 76 and 78. The valve element 14 is movable in the directions of the forward and return stroke of the hammer to switch fluid pressure in the lower cavity 50 alternately from supply to return pressure in order to maintain the oscillation of the hammer. The length of the valve element 14 is nearly equal to the distance between the upper and lower edges of the supply and return ports 76 and 78 such that the ports will be alternately opened and closed as the hammer slides within the bore. Suitable seals and "O" rings are used to keep the pressurized fluid confined in the cavities 50 and 52 within the housing.

The valve element 14 is provided with a step 80 which faces in the return stroke direction and forms, with a step 82 in the liner 24, a valve cavity 84. This valve cavity is in continuous communication with the return gallery 58 by way of lateral passages 86. The upper end 88 of the valve element 14 is in interfering relationship with the side 90 of the hammer section 48 which faces the lower cavity 50.

The hammer 12 has a portion 92 which tapers inwardly towards the axis of the hammer and away from the side 90. The upper end 88 of the valve element 14 and the surface of the tapered portion 92 form a tapered pocket out of which fluid can flow through a variable area orifice between the tapered surface of the portion 92 and the inner edge 94 of the upper end 88 of the valve element 14. Thus the hammer step 90 may be in engagement with the valve element 88 through the hydraulic fluid in the partially confined volume therebetween. This arrangement for controlling the motion of the valve element 14 and gradually accelerating it upon engagement with the hammer is also described in the above-referred to U.S. Patent Application, Serial No. 522,977.

The lower bearing member 28 has an upper portion 96 which is in sliding contact with the peripheral surface of the hammer 12. The upper end of this portion 96 is formed with a lip 98 having an outer diameter slightly smaller than the inner diameter of the lower end 100 of the valve element 14. The portion 96 forms a pocket 102 at the lower end of the cavity 50 which is defined between the wall of the liner 24 and the portion 96. In other words, the portion 96 is between the surface of the hammer 12 and the surface of the liner 24. The lower end of the valve element is received in the pocket 102 when the valve element 14 travels to the lower end of its forward stroke. The extent of the displacement of the valve element in the forward stroke direction into the pocket 102 is controllable by the position of the valve 106.

Channels 104 and 105 which extend laterally from the surface of the lower bearing member 28 to the supply gallery 54 are provided with a flow control valve mechanism 106. This valve mechanism 106 includes a plunger or stem 108 which is adjustably positioned with respect to a seat 110 in the housing 20 so as to provide a variable area orifice in the channel 104 to supply via the supply gallery 54. The valve mechanism 106 may be set by the set screw arrangement 112 which is accessible from the outside of the housing 20. By virtue of such control and also of the trapping of the valve in the pocket 102, the stroke of the hammer and the frequency and energy of the blows delivered by the hammer upon impact with the shank 34 is made controllable as will be described more fully hereinafter.

A port 114 is provided by a plurality of holes which are circumferentially spaced around the portion 96 just below the lip 98. A passage in the form of a peripheral groove 116 in the hammer 12 first connects the port 114 with the channel 104 for a first interval of time as the hammer 12 reaches the impact position. As the hammer moves upwardly in the return stroke direction, the peripheral groove 116, acting as a porting groove, closes the connection to the channel 104 to trap the fluid and the valve 14 in the pocket 102 for a second interval of time. Then the groove 116 connects the ports 114 to the lower cavity 50. The valve 106 controls the displacement of the valve element 14 into the pocket during the first interval. The valve 106 controls the flow of fluid from the pocket under the pressure created by the lower end 100 of the valve 14. The distance which the valve element 14 will travel in the forward stroke direction is a function of the setting of the valve 106. The flow out of the pocket is to supply. This reduces hydraulic losses as would be the case if the flow from the pocket went to return. The only loss due to the frequency and blow control feature is the dissipation of the kinetic energy of the valve element 14 in the passage of fluid through the hydraulic resistor in the channels 104 and 105. The saving in hydraulic losses, in terms of the power requirements of the pump and its drive motor, can be from 10% to 20%.

Prior to the entry of the valve 14 into the pocket 102, the supply ports 76 are opened and the lower cavity 50 is switched to supply. The hydraulic forces on the hammer 12 drive it upwardly in the return stroke direction. The groove then for an interval of time (referred to above as the second interval of time) closes off the pocket 102 (see FIG. 4) by cutting off communication with the channel 104. Supply pressure can not build up in the pocket since the channel 104 is closed off from the pocket. Flow with respect to the pocket is cut off and the valve is locked in the position it reached during the forward stroke for this second interval of time. The distance which the valve travels into the pocket (viz, the displacement of the valve into the pocket) determines the frequency and blow energy parameters of the tool. By virtue of the trapping of the valve, variations in this distance are prevented and the frequency and blow energy selected by the valve 106 are exactly obtained during operation.

Another feature obtained by trapping the valve 14 is that the step 80 in the valve 14 may be made larger than would be the case in the absence of trapping. The larger the area of the step 80 the greater the hydraulic forces on the valve 14. These larger forces could start to drive the valve out of the pocket prematurely if the valve 14 were not trapped. Large forces are desirable during the return stroke, however, since they produce rapid switching of the pressure in the lower cavity from supply to return at the end of the return stroke to initiate the next forward stroke. These larger hydraulic forces are tolerated and obtained due to the trapping action of the system. Further the need for a smaller step 80 which would be difficult, and in small tools impractical, to machine is obviated.

The valve 14 is pressure actuated in the return stroke direction by virtue of the force due to the pressure across the differential area of the valve (viz, the area of the step 80) in plane normal to the direction of valve element motion. After the valve element leaves the pocket 102, this force is essentially constant and thus the time required for the valve to switch the pressure in the lower cavity 50 is a function of the displacement of the valve into the pocket 102 which is in turn controlled by the setting of the valve 106. The length of the return stroke of the hammer and the following forward stroke is thus variable in accordance with the position of the valve 106. The impact or blow energy is directly related to the hammer stroke and the frequency of the impact is inversely related to the length of the hammer stroke. Accordingly, the valve 106 provides both blow frequency and blow energy control. The operation of the tool and its variable blow energy and blow frequency characteristics will be more apparent from FIGS. 3 through 6 which illustrate the impact tool 10 with its hammer 12 and valve 14 in different positions during a cycle of oscillation.

Consider the hammer to be at impact position as shown in FIG. 3. The hammer has a high downward velocity because the lower cavity 50 has been opened to return through the return port 78 (see FIG. 1 for the position of the hammer 12 and valve 14 just prior to impact). The hammer 12 is driving the valve 14 in the forward stroke direction at substantially the same velocity as that of the hammer. At impact, the velocity of the hammer is suddenly arrested. The valve element 14 is free to coast in the forward direction at or near the velocity of the hammer. Just as the hammer reaches the impact position the valve element 14 opens the supply port 76 and closes the return port 78. The opening of the supply port relieves any fluid in the partially confined volume between the side 90 of the hammer and the upper end 88 of the valve element 14. There is then no fluid retained in this partially confined volume to retard the valve element 14 or to cause cavitation therein.

The peripheral groove 116 is disposed in position to connect the port 114 (to the pocket 102) to the channel 104. The valve element 14 coasts into the pocket as shown in FIG. 4. The opening between the seat 110 and the upper end of the stem 108 of the valve 106 determines how far the valve's momentum will carry it in the forward stroke direction into the pocket 102. By opening the valve 106 and increasing the gap between the stem surface 108 and the seat 110 the displacement of the valve element into the pocket may be increased. Conversely by closing the gap between the stem 108 and the seat 110 the displacement of the valve element into the pocket will be reduced.

Once the valve 14 velocity is arrested and the hammer has retracted to close the channel 104, the pressure in Pocket 102 is reduced below supply pressure. Accordingly, since the upper end 88 of the valve element 14 presents an area in a plane normal to the valve motion to supply pressure, there exists a differential pressure across the ends of the valve which tends to hold the valve element 14 in the pocket until the peripheral groove 116 has moved to a position for connecting the pocket 102 to the lower cavity 50.

Immediately after the supply port 76 is opened, the pressure in the lower cavity 50 is switched to supply. There is then a net force across the hammer, due to a larger area being presented to supply pressure in the lower cavity than to supply pressure in the upper cavity 52. This net force drives the hammer in the return stroke direction away from the impact position. As the hammer 12 leaves the impact position, the connection to the channel 104 is closed. Inasmuch as there is no flow from the pocket 102 (the pocket still being at reduced pressure in FIG. 4) the valve element is trapped in the pocket until the hammer 12 moves upwardly a sufficient distance to connect the pocket to the lower cavity 52 by way of the port 114 and groove 116. The valve element 14 is then pressure actuated in the return stroke direction due to the difference in the pressures in the lower cavity 52, which is at supply, and the valve cavity 84, which is at return.

Figure 6:
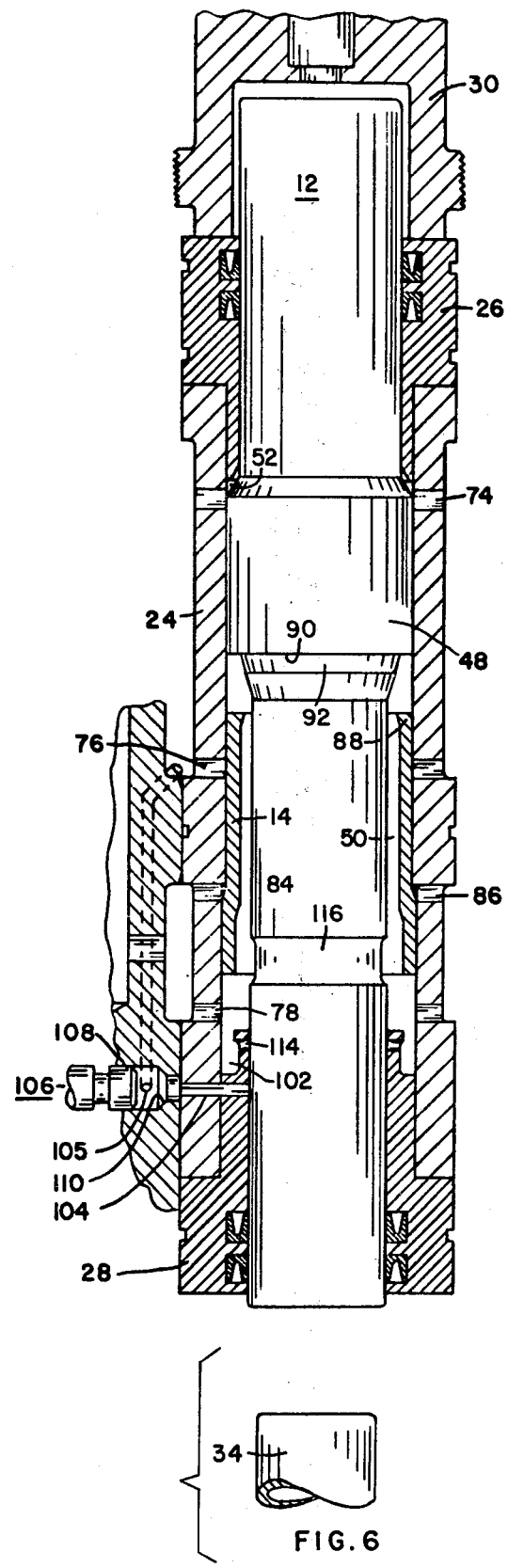

The valve element 14 continues to move upwardly in the return stroke direction until it reaches the switching position shown in FIG. 5. The valve then closes the supply port 76 while opening the return port 78. Supply pressure in the upper cavity 52 exerts a force on the hammer 12 in the forward stroke direction and causes the hammer to be decelerated to zero velocity at the top of its travel in the return stroke direction which position is shown in FIG. 6. The valve element 14 continues to move upwardly to the position shown in FIG. 6 since the pressures are balanced on the valve element after it switches the pressure in the lower cavity 50 while travelling in the return stroke direction. After reaching the top of its stroke, the hammer is accelerated downwardly in the forward stroke direction. The hammer side 90 then again engages the valve element 14, and the cycle repeats with another impact occurring at the shank.

The energy delivered to the hammer on each return stroke is equal to the differential pressure ($P_S - P_R$) across the hammer central section 48 multiplied by the area of the hammer ($A_H$) exposed to the lower cavity (viz, the area of the side 90 and so much of the area of the tapered portions 92 which are in a plane perpendicular to the direction of motion of the hammer) multiplied by displacement of the hammer ($X_H$). Accordingly, the blow energy delivered to the shank is equal to ($P_S - P_R$)$A_H X_H$. The hammer stroke $X_H$ is, in accordance with the equation of motion of the hammer, equal to $$\tfrac{1}{2} P_S (A_H - A_C)(1/M_H) t_1^2,$$

where ($A_C$) is the area of the hammer exposed to the upper cavity, ($M_H$) is the mass of the hammer, and $t_1$ is the period of time during which the supply port 76 is open. In this illustrative embodiment the area $A_C$ is approximately equal to one-half the area $A_H$. By closing the control valve 106 the valve element 114 will stop quickly and have only a small displacement into the pocket. Thus the valve element 14 will have a short distance to travel in the return stroke direction to the switching position after the groove 116 connects the pocket 102 to the lower cavity 50 and releases the valve element 14. Thus by closing the control valve 106 and reducing the orifice between the stem 108 and seat 110, $t_1$ and therefore $X_H$ are reduced; thus reducing the blow energy and increasing the blow frequency. Conversely, by opening the valve 106 the displacement of the valve element 14 into the pocket 102 is increased and the hammer stroke is correspondingly increased. The blow energy is then increased while the blow frequency is reduced.

From the foregoing description it will be apparent that there has been provided an improved hydraulic oscillator and impact tool utilizing the same. Variations and modifications in the illustrated impact tool will undoubtedly become apparent to those skilled in the art. Accordingly, the foregoing description should be taken as illustrative and not in any limiting sense.

What is claimed is:

1. In a hydraulic oscillator having a piston and valve element both movable in opposite directions and both disposed in a cavity in which hydraulic pressure is switched in opposite senses between supply and return pressures by said valve element to develop forces to effect the oscillatory movements of said piston in said opposite directions, apparatus for controlling the frequency and displacement of said piston by controlling the movement of said valve element which comprises
    (a) means in said cavity defining a pocket for receiving said valve element when it moves in one of said directions and has switched the fluid pressure in said cavity in one of said opposite senses so as to develop forces on said piston in the direction opposite to said one direction,
    (b) channel means operative when in communication with said pocket for providing a path for the controllable flow of hydraulic fluid from said pocket when said valve element is received therein, and
    (c) means in said piston for providing said communication between said channel means and said pocket when said piston has moved to a position near the end of its displacement in said one direction, for closing off communication with said pocket when said piston has moved in said opposite direction away from said position near said end of said displacement in said one direction so as to trap said valve element and said fluid in said pocket, whereby the displacement of said valve in said one direction and the period of time for said valve element to switch the fluid pressure in said cavity in the other of said opposite senses so as to again enable the development of forces on said piston in said one direction is controllable as a function of the flow through said channel means.

2. The invention as set forth in claim 1 wherein said communication providing means is also operative to provide communication after said piston has moved over a further displacement in said opposite direction from said position where said valve element is trapped in said pocket, between said pocket and said cavity, whereby to develop hydraulic forces on said valve element in said opposite direction.

3. The invention as set forth in claim 2 wherein said piston is engageable with said valve element to move said valve element in said one direction.

4. The invention as set forth in claim 3 wherein said channel means has valve means therein for adjustably controlling the flow of said fluid from said pocket.

5. The invention as set forth in claim 3 wherein said channel means is in continuous communication with supply.

6. The invention as set forth in claim 3 wherein ports from supply and to return are in communication with said cavity, said valve element being disposed to alternately open and close said supply and return ports such that one of said ports is open when said valve element is received in said pocket and the other of said ports is closed.

7. The invention as set forth in claim 6 wherein said one port is said supply port, and means in said valve element in communication with said return for providing a differential pressure across said valve element to develop forces to move said element in said opposite direction when said supply port is open and pressure in said chamber is switched to supply pressure.

8. The invention as set forth in claim 7 wherein said communication means in said piston is a groove in the peripheral surface thereof, and a second channel extending from said piston to said pocket and being spaced from said first named channel in said opposite direction, said groove being of sufficient length to bridge said first and second channels.

9. The invention as set forth in claim 8 wherein said valve element is a sleeve disposed around said piston.

10. The invention as set forth in claim 9 wherein said pocket defining means includes a fixed tubular member disposed at one end of said cavity between said piston and said valve element when said valve element is received in said pocket, said second channel extending through said tubular member, and said first channel being spaced in the direction of said one end of said cavity away from said second channel.

11. A pressurized fluid oscillator which comprises
 (a) a housing having a cavity,
 (b) a movable piston disposed for oscillation over forward and return strokes in said cavity,
 (c) a valve element movably disposed together with said piston in said cavity,
 (d) supply and return ports for communicating pressurized fluid with respect to said cavity, said valve element being disposed to alternately open and close said ports to develop forces upon said piston so as to sustain the oscillation thereof,
 (e) said piston being engageable with said valve element when movable in the direction of at least one of said strokes for actuating said valve element, said valve element being free to move in the direction of said one stroke over a displacement greater than the displacement over which said piston is free to move after engagement of said valve element by said piston, and said valve element being disposed to open the one of said ports which is closed and close the one of said ports which is open before said piston reaches the end of its travel in the direction of the other of said strokes,
 (f) said housing having a portion defining a pocket extending into said cavity and into which said valve element enters upon movement in the direction of said one stroke,
 (g) channel means in said housing for the circulation of said pressurized fluid, and
 (h) means in said piston and housing for communicating said pocket with said channel means after movement of said piston in said one stroke direction, for closing said pocket after movement of said piston over a first distance in the direction opposite to said one stroke direction away from the end of said one stroke thereof to trap said valve element in said pocket, and for communicating said pocket with said cavity after movement of said piston over another distance in the direction opposite to said one stroke direction whereby to control the movement of said valve element.

12. The invention as set forth in claim 11 wherein said channel means has a flow control valve therein.

13. The invention as set forth in claim 12 wherein said channel means is in continuous communication with supply via said valve.

14. The invention as set forth in claim 11 wherein said communicating means includes a port between said pocket and said piston, a passage extending to the surface of said piston, said passage being of sufficient length to bridge said channel means and said pocket port.

15. An impact tool for repetitively generating percussive forces comprising
 (a) a housing having a bore therein,
 (b) a hammer disposed in said bore for oscillatory movement over a forward stroke to an impact position and over a return stroke away from said impact position,
 (c) said hammer having a section extending to the surface of said bore and dividing said bore into at least a first and a second cavity on opposite sides of said section,
 (d) a movable valve element in said first cavity operable to alternately open and close ports for the supply and return of pressurized fluid to said first cavity so as to switch the pressure in said cavity alternately between supply and return pressure whereby to develop forces upon said hammer to effect the oscillatory movement thereof,
 (e) said hammer being engageable with said valve element to effect movement thereof with said hammer in the forward stroke direction until said hammer reaches said impact position whereupon said valve element continues to travel in said forward stroke direction under its own momentum,
 (f) means disposed between the peripheral surface of said hammer and the surface of said housing which defines a pocket for receiving said valve element upon the continuation of its travel in said forward stroke direction,
 (g) said supply and return ports being disposed with respect to said pocket such that said supply port is open and said return port is closed when said valve element is received in said pocket,
 (h) a port in said pocket defining means extending between said pocket and said hammer,
 (i) a channel in said housing, spaced from said pocket port in the forward stroke direction, for the flow of fluid from said pocket when said valve element is received therein, and
 (j) passage means extending to the surface of said hammer and positioned to communicate said pocket port and said channel for a first interval of time when said hammer is at said impact position and for closing off said pocket and trapping said fluid and said valve element therein for a second interval of time after said hammer has moved in said return stroke direction away from said impact position.

16. The invention as set forth in claim 15 wherein said passage means is operative to alternately communicate said pocket port with said channel and with said first cavity as said hammer moves further in the return stroke direction away from said impact position.

17. The invention as set forth in claim 16 wherein said passage means is a peripheral groove around said hammer.

18. The invention as set forth in claim 15 further comprising valve means in said channel for controlling the flow of fluid therethrough and thereby controlling the length of the stroke of said valve element so as to control the frequency and energy of the impacts delivered by said tool.

19. The invention as set forth in claim 18 wherein said channel means extends between a surface of said housing which extends to said hammer and supply.

20. The invention as set forth in claim 15 wherein a surface of said housing which defines said first cavity, and the surface of said valve element adjacent thereto, define a third cavity therebetween which presents an area in a plane perpendicular to the axis of said bore, and a passage communicating said third cavity with return.

21. The invention as set forth in claim 20 wherein said hammer section presents an area in a plane perpendicular to the axis of said bore to said first cavity larger than to said second cavity, and means for continuously communicating said second cavity with supply.

* * * * *